United States Patent Office 3,523,056
Patented Aug. 4, 1970

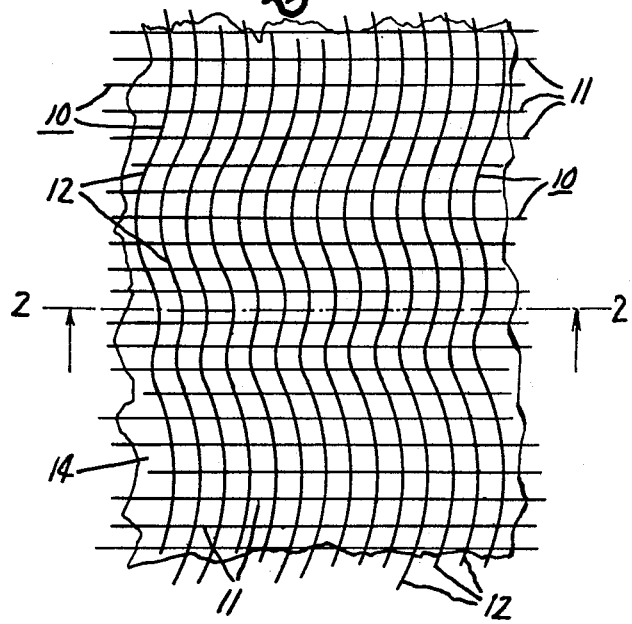
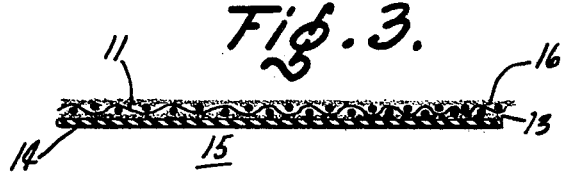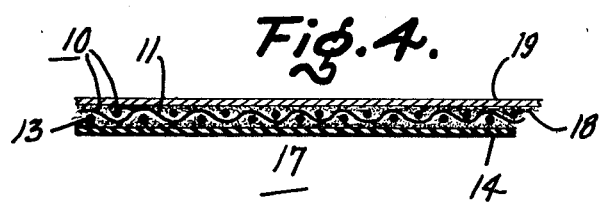

3,523,056
STRETCHABLE SILICONE BONDED, COMPACTED GLASS FABRIC-POLYIMIDE LAMINATE TAPE AND METHOD FOR MAKING THE SAME
Albert E. Horning, Troy, N.Y., assignor to General Electric Company, a corporation of New York
Filed Dec. 13, 1967, Ser. No. 690,111
Int. Cl. B32b 3/30; D03d 1/00, 3/08
U.S. Cl. 161—93
6 Claims

ABSTRACT OF THE DISCLOSURE

A stretchable, conformable, electrically insulating tape contains a long narrow strip of a woven glass fabric, the fibers of which are compacted in the warp direction, adhesively secured to a polyimide film backing with a silicone adhesive. The tape is made by elongating the polyimide backing, coating the backing with a curable silicone adhesive, applying a long narrow strip of woven glass fabric to the backing, curing the silicone adhesive and removing the tension on the polyimide film, thus allowing the polyimide film to relax and to crinkle the glass fibers of the cloth in the warp direction. The tape is used to wrap field windings of electric motors.

---

The present invention relates to resilient, elastomeric electrical insulating tapes and has particular reference to electrical insulating tapes having exceptional performance at temperatures over 180° C.

In the manufacture of field windings of electric motors, various expedients have been used where it is necessary to tape around corners and uneven surfaces. One method of winding tape around corners in field windings has been to cut and splice the tape at the corners. This involves considerable labor, starting and stopping the winding machines, and has required larger size windings in order to provide the necessary space required for the cutting and splicing operation. Another method for obviating the problem has been to use a stretchable glass fabric insulating tape in the winding operation. One type of tape which has been used is glass fabric which has been cut at a bias in order to provide the elongation and conformability required by a coil winding machine in winding around corners. Bias cut glass fabric is fabric which has been cut from a sheet at a 45° angle and thus, by necessity, must be of fairly short length and the short lengths are usually spliced together. Here again, exists a cutting and splicing operation, if a long tape is desired.

Another method which has been used to provide the extensibility required by the coil winding machines has been to use a glass fabric containing a warp of compacted glass fibers or a warp containing glass fibers in a sinusoidal configuration.

The tape containing the compacted glass fiber, is produced by including heat shrinkable organic fibers in the fiber glass cloth initially used to produce the tape and heating and shrinking such organic fibers after the tape is produced. The tape containing the glass fibers in a sinusoidal configuration is produced by weaving a fabric having a glass fiber warp and an easily deformable organic fiber woof.

Motors using field windings insulated with organic fiber containing insulating cloth perform well on a routine basis. However, in emergency situations such as aircraft fires, or overheating due to motor bearing failure, a charring of the organic fiber takes place which causes the insulation to become electrically conductive resulting in motor failure. It is in emergency conditions that such equipment such as landing gear motors, motor generators for communications equipment, and motors for maintaining aircraft control must be functional. It is such problems that the present invention is designed to alleviate.

The present invention relates to a tape which provides far superior safeguards in case of overheating and fire in aircraft than has been provided by the prior art tape structures mentioned, thus providing a greater assurance of control of aircraft in times of emergency, or for that matter any other electrically controlled vehicle or machine. The elastic insulating tape laminate of the present invention has a glass fabric layer bonded to a polyimide film with a silicone adhesive. The warp threads of the glass fabric are in a crinkled condition, thus allowing for extensibility in the warp direction.

The insulating tapes of the present invention are made by stretching a polyimide film backing preferably from 5 to 10% of its original length, applying a coating of a curable silicone adhesive to the stretched polyimide film backing, then applying the woven glass fabric to the adhesive, and curing the adhesive. The tension is then removed from the polyimide film backing and the polyimide film recovers most of the length which it had lost in stretching, thus crinkling the glass fibers in the warp direction.

The polyimide film backed tapes of the present invention are superior to the elastic tapes of the prior art which relied upon heat shrinkable fibers interwoven with the glass fibers in that the tapes of the present invention withstand up to 700° C. before destruction of the stretchable polyimide backing takes place. The prior art tapes containing heat shrinkable organic fibers began to carbonize and become conductive at temperatures below 250° C.

For a more complete understanding of the present invention, reference is made to the following description taken in conjunction with the accompanying drawing:

FIG. 1 is a plan view of a section of the glass fabric face of the tape of this invention in which all of the yarn in the warp is in a crinkled condition capable of elongation and in which all the yarn in the weft is in a substantially straight non-elongatable condition.

FIG. 2 is a cross sectional view of a polyimide film bonded to a glass fabric by a layer of silicone adhesive.

FIG. 3 is a cross sectional view of a stretchable tape made from a glass fabric bonded to a polyimide film by a layer of silicone adhesive and in addition containing a layer of a pressure sensitive adhesive on the surface of the fabric opposed to the polyimide film.

FIG. 4 is a sectional view of a tape containing a glass fabric bonded to a polyimide backing through a silicone adhesive on one face of the fabric and bonded to a silicone impregnated asbestos strip through a silicone adhesive on the other face of the fabric.

FIG. 1 is a plain view of a section of tape having on its surface glass fabric 10 composed of glass fibers. Weft 11 is composed of substantially straight, uncompacted glass fibers. Warp 12 is composed of crinkled fibers which lie in a wavy configuration.

Looking next at FIG. 2, there is illustrated a sectional view taken across section 2—2 of FIG. 1. In the tape illustrated, the glass fabric 10 is bonded to a polyimide film backing 14 by a polyorganosiloxane resin 13. Polyimide films are known in the art and are described in the literature and in patents. One such reference is an article by C. E. Scroog et al., entitled "Aromatic Polypyromellitimides from Aromatic Polyamic Acids" in the Journal of Polymer Science, Part A vol. 3, pages 1373–1390 (1965). Generally speaking these films are prepared by reacting pyromellitic anhydride with a diamine to form a polyamic acid. The polyamic acid is cast into a film, then dehydrated to the corresponding polyimide.

Examples of diamines which may be used to make the polyimide include p-phenylenediamine, m-phenylenediamine, bis(4-aminophenyl)methane, bis(4-aminophenyl)isopropylidene, bis(4 - aminophenyl)sulfide, bis(4-aminophenyl)sulfone, and bis(4-aminophenyl)ether.

The polyimide film made from bis(4-aminophenyl)-ether is commercially available as Kapton film.

Looking next at FIG. 3, there is illustrated a cross sectional view across the width of tape 15. Tape 15 is constructed in the same manner as the tape of FIG. 2, except that a layer 16 of pressure sensitive silicone adhesive has been applied to the exposed surface of glass fabric 10.

The pressure sensitive adhesive in layer 16 is well known in the art and is described, for example, in Pat. 2,736,721—Dexter, Pat. 2,814,601—Currie et al. and Pat. 2,857,356—Goodwin, all of which are incorporated by reference into the present application and for details of the methods of preparing such compositions. A number of such methods are applicable and the present invention is not dependent upon the particular method by which the resinous copolymer is made.

One class of pressure sensitive adhesives is that of Currie et al. and consists of (1) from 40 to 75 percent by weight of a benzene soluble resin copolymer of $SiO_2$ units and $R_3SiO_{0.5}$ units, where R is of the group methyl, ethyl, propyl, vinyl and phenyl radicals, at least 90% of the total R radicals being aliphatic, and in which copolymer resin, the ratio of $R_3SiO_{0.5}$ units to $SiO_2$ units is from 0.5 to 1.5 and preferably is from 0.55 to 0.75 inclusive, and (2) from 25 to 60% by weight of a silanol end-stopped diorganopolysiloxane fluid of from 5,000 to less than 1,000,000 centistokes viscosity at 25° C. in which fluid the organic radicals are of the group methyl, ethyl, vinyl and phenyl radicals, at least 75% of the total number of radicals being aliphatic.

The above compositions are prepared by merely mixing siloxanes (1) and (2) and a curing catalyst and curing the composition. This can be accomplished by heating the composition. Generally speaking, it is preferable to employ a solvent as a carrier for the adhesive, such as an aromatic hydrocarbon solvent. The catalyst used is selected from those later mentioned for the cure of the resin used to impregnate asbestos paper.

FIG. 4 is a sectional view across the width of tape 17 within the scope of the present invention wherein the fabric 10, film 14 and resin 13, are as described in the discussion concerning FIG. 3. The tape is further modified by a facing 19 of asbestos having its interstices filled with a cured in situ elastomeric silicone resin. The asbestos facing is secured to the glass fabric by adhesive 18. Adhesive 18 can be selected from the aforementioned pressure sensitive adhesive or can be selected from the latter mentioned impregnating resins.

The asbestos tape impregnated with an elastomeric silicone resin is described and claimed in my copending application, Ser. No. 690,081, filed concurrently herewith and assigned to the same assignee as the present invention. This copending application is incorporated by reference into the present application for a complete description of such impregnated tape. This tape is made by impregnating an asbestos mat with a resin containing $SiO_2$ units and $R_3SiO_{1/2}$ units in an average ratio of 0.5 to 1.5 $R_3SiO_{1/2}$ unit per $SiO_2$ unit, mixed with a low molecular weight silanol fluid having an average R to Si ratio of 2.0 and subsequently curing the mixture of silicone to an elastomeric composition. The resin constitutes 10 to 65% by weight of the total siloxane. The elastomeric composition is one which contains $R_3SiO_{1/2}$ units, $R_2'SiO$ units and $SiO_2$ units. The silanol fluid used to form the impregnating resin is composed of diorganosiloxy units and constitutes 35 to 90% by weight of the total siloxane content of the impregnant. The silanol fluid is of low molecular weight which readily penetrates the asbestos mat and wets the individual asbestos fibers. The organopolysiloxane impregnant composition preferably contains 40 to 60% by weight of resin and 40 to 60% by weight of silanol end-stopped fluid based upon total silicone of the silanol end-stopped diorganopolysiloxane fluid. It is by this interaction of penetration and wetting that the marriage of the physical properties of the asbestos tape and the silicone takes place.

The impregnating compositions are generally applied in an organic solvent such as benzene, toluene, xylene, etc. The method of applying the solution to the mat is not critical and the solution may be applied by brushing, spraying, dipping, calendering or any other known method of applying fluid to a porous substrate and is preferably accomplished by a flow dipping process. The flow dipping process involves floating an asbestos mat across a pool of the impregnating solution at such a rate that by the time the mat crosses the pool it is thoroughly wetted and the wetted portion sinks below the surface of the impregnating solution. The mat then passes under a roller submerged in the solution and is then brought up out of the solution. Any excess impregnating solution is wiped from the mat and the mat is then freed from the solvent and the impregnant is cured. The drying and curing temperature may range from room temperature to 200° C. but is preferably from 80° C. to 150° C. After the solution is applied to the asbestos mat the excess fluid is usually wiped from the surface of the mat and the mat is heated to evaporate the solvent and cure the reactive siloxane mixture to an elastic impregnant. The mat is then cut to the desired widths.

The asbestos mat used in the practice of the present invention is a sheet composed of non-woven asbestos fibers randomly oriented in one plane. Chrysotile fibers from the Quebec or African deposit which have a volume resistivity of approximately 0.015 meg ohm-inch, are the preferred form of asbestos fibers. The mat contains no added binder and has very little tensile strength. The mat used generally has a thickness of 3 to 10 mils. A penetration problem begins to arise when a mat having a thickness of 10 mils is used and becomes more pronounced as the thickness of the mat increases.

The resinous copolymers containing $R_3SiO_{0.5}$ units and $SiO_2$ units, which are reacted with a silanol fluid in the interstices of the asbestos mat, are well known in the art and are described, for example, in Pat. 2,766,182—Daudt et al. and in Pat. 2,857,356—Goodwin, both of which are incorporated by reference into the present application for details of the method of preparing such compositions. A number of such methods are applicable and the present invention is not dependent upon the particular methods by which the resinous copolymers are made.

When the resins described in the Goodwin, patent or the resins described in the Daudt et al. patent are used in the practice of the present invention, the organo groups of the triorganohydralyzable silane are generally selected to be the organo groups of the silanol stopped polydiorganosiloxane fluid which is copolymerized with the resin to form an elastomeric impregnant. Preferably all of the organo groups of the triorgano hydrolyzable silane are methyl groups, but a minor percentage, for example, up to about 20% of these groups can be other monovalent hydrocarbon groups, such as ethyl, phenyl, vinyl, or the like. Preferably not more than 13% of the organo groups contain aromatic substituents.

The resinous copolymer is generally employed in 55 to 65% by weight solid solution with the solvent being benzene, toluene, xylene, or the like. The reaction conditions are generally adjusted so that the viscosity of the final resin in a 60% by weight solids in xylene solution is 100 centipoises or less. This low viscosity solution, has excellent wetability and penetration characteristics.

The molecular weight of the resin can be limited by stopping the condensation reaction when a desired viscosity is reached. The molecular weight of the resin, however, is not critical and high molecular weight resins can be employed to obtain good wetting and penetration of the asbestos fibers. When high molecular weight resins are used, however, it is often advisable to use a more dilute solution.

The linear silanol chain-stopped polydiorgano-siloxane fluid having a viscosity up to 15,000 centistokes when measured at 25° C., is well known in the art and generally comprises a polydimethylsiloxane, but can also comprise other types of siloxane units and in many applications, especially high temperature applications, a desirable copolymer is one in which up to 13% of the units are diphenyldisiloxane units, methylphenylsiloxane units, methyl-vinylsiloxane units, phenylvinylsiloxane units, or the like, with the remaining siloxane units being dimethylsiloxane units. In general, these linear silanol chain-stopped polydiorganosiloxanes have the formula,

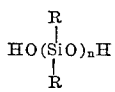

where $n$ is a whole number having a value of 100 to 900, which provides a silanol chain stopped polysiloxane having a viscosity of not more than 15,000 centistokes at 25° C. Preferably the viscosity of the fluid is 100 to 1000 centistokes.

Illustrative of the monovalent hydrocarbon radicals, represented by R, and alkyl radicals, e.g., methyl, ethyl, butyl, octyl, octadecyl, etc. radicals; aryl radicals, e.g., phenyl, naphthyl, tolyl, xylyl, etc. radicals; aralkyl radicals, e.g., benzyl, phenylethyl, etc. radicals; alkenyl radicals, e.g., vinyl, allyl, etc. radicals; and cycloaliphatic hydrocarbon radicals, e.g., cyclohexyl, cycloheptyl, cyclohexenyl, etc. radicals. Included within the scope of these monovalent hydrocarbon radicals are also radicals containing various substituents which are inert under the conditions of the reaction. These radicals include, for example, halogenated derivatives of the above mentioned monovalent hydrocarbon radicals, such as chloromethyl, chlorophenyl, dibromophenyl, trifluoromethylethyl, etc. radicals and cyanoalkyl radicals such as β-cyanoethyl, β-cyanopropyl, gamma-cyanopropyl, etc. radicals.

Since this invention involves intercondensation between a silanol-containing polydiorganosiloxane fluid and a silanol-containing resin in the interstices of an asbestos mat, the fluid-resin mixture must be applied to the tape, then subjected to conditions which would result in such intercondensation. This intercondensation is relatively simple and merely requires mixing the resinous copolymer and the fluid and heating the mixture to effect the intercondensation. In general this intercondensation is effected by heating the reaction mixture at a temperature of about 80 to 150° C. In particular, since the resinous copolymer is present at 35 to 60% solids solution, it is desirable to use this solution as the basis from which to synthesize the elastomeric impregnant. This generally involves the addition of more solvent which advantageously is an aromatic hydrocarbon solvent such as benzene, toluene, or xylene, and then the silicon fluid is added to the resulting solution.

Catalysts which may be used in the practice of the present invention include metal soaps, for example, tin ricinoleate, or lead naphthanate; metal chelates for example, chromium-acetyl-acetonate, metal salts of thio or dithio-carbamic acids, for example, lead salts of mercaptobenzthiazole and zinc ethylphenyl-dithiocarbamate etc.; metal oxides for example, mercuric oxide, cadmium oxide, or lead oxide (PbO) etc.; organo-metal compounds, for example, phenyl mercury acetate, or dibutyltin-dilaurate; organic bases preferably nitrogen bases, including primary, secondary, tertiary and quaternary amines, for example, gamma-aminopropyltriethoxysilane, ethylenediamine, triethanolamine, and 1-methylpyridiniumhydroxide. Other nitrogen containing catalysts which may be used include the imines such as polyethyleneimine.

The preferred catalysts are the organosilicon compounds containing aminoxy groups. The preferred catalysts and instructions as to their use are set forth in U.S. Pats. 3,296,199 and 3,341,486—Murphy. The aminoxy containing catalysts are more soluble in the impregnating solution and show less tendency to separate out on prolonged standing. Examples of aminoxy catalysts which may be used include gamma-aminopropylmethyl - (N,N - diethylaminoxy)silanes and dimethyldi-(N,N-diethylaminoxy)silane.

The asbestos mat used to form the tape is basic and also acts as a catalyst. Other catalysts which may be used are acid catalysts for example, boric acid, more especially organic acids, such as oleic acid. Both organic acids and organic bases are effective condensation catalysts in the reaction between the above described resin and the above described fluid. On the other hand, many metal salts of simple carboxylic acids have the disadvantage that they act too slowly. For example, many zinc, manganese, cobalt, and iron salts of organic acids, while effective as catalysts, do not provide a fast enough cure and other catalysts which provide a rapid cure are preferably selected in the practice of the present invention. The use of many of the above described catalysts systems in a silanol condensation reaction is described in U.S. Pat. 3,127,363.

Other systems for securing cure of a system containing silanol-containing resins and silanol-containing fluids include the use of mixtures of hydrocarbonoxy silicates and carboxylic acid salts of certain metals with or without heat, see U.S. Pat. 2,927,907; the use of a mixture of a substantially nonvolatile alkylpolysilicate in an aliphatic amine, see U.S. Pat. 2,833,742; the use of certain sulfur compounds, see U.S. Pat. 2,909,756; the use of sulfur with or without sulfur vulcanization accelerators in conjunction with alkenyl-substituted siloxanes, see U.S. Pat. 2,999,077; the use of polyamines with certain halogen containing organosiloxanes, see U.S. Pat. 2,728,743; and the use of tin salts of organic acids, see U.S. Pat. 2,999,077.

Organic peroxides such as benzoylperoxide also can be used as catalysts. Organic peroxides such as cyclohexanone peroxide, urea hydrogen peroxide, diethyl peroxide, dicumyl peroxide, and benzoyl peroxide, etc., can also be used as catalysts but require the use of heat if a fast cure is to be effected.

The above mentioned catalyst, resin and fluid systems used for impregnating, can also be used in the adhesive system to bond the polyimide film to the glass fabric and also to bond the asbestos adhesive facing to the glass fabric in lieu of the aforementioned pressure sensitive adhesives. The composition when used as an adhesive is cured in the same manner as was described for the impregnating solution.

As mentioned earlier, the method generally employed for making the impregnated asbestos tape involves floating an asbestos mat on the surface of the impregnating solution as an initial step. This is done to eliminate air bubbles. If the asbestos mat were immediately submerged into the impregnating solution large quantities of air would be trapped in the interstices of the asbestos, thus preventing complete impregnation.

The facing 19 may be adhesively secured to the glass fabric sheet with one of the pressure sensitive adhesive compositions of layer 16 listed in the earlier discussion of pressure sensitive adhesives. The preferred method, however, of securing the asbestos facing to the glass fabric is by taking the asbestos which has been impregnated with the above described solution before it is cured and passing the composite formed between pressure rollers. The composite formed is then dried and cured by the same method as was above described for the asbestos sheet. Silicone pressure sensitive adhesives are well known in the art and are shown, for example, in Pat. 2,736,721—Dexter, Pat. 2,814,601—Currie et al., and Pat. 2,857,356—Goodwin.

The impregnated asbestos facing 19 on the tape of the present invention prevents face to face contact of the glass fabric when the tape is doubled back upon itself in such applications as slot insulation between the field windings and the housing of electric motors. The vibration involved in such application, while very slight, causes the glass fibers of the opposed faces to rub together and disintegrate; however, when the impregnated asbestos tape is used as a facing material the glass fibers are protected from rubbing contact.

The following examples are set forth to indicate more fully the nature and capabilities of electrical insulating tape of this invention, and are not intended for the purpose of limitation. Unless otherwise indicated all parts are by weight.

EXAMPLE 1

A one mil thick, one inch wide, and 36 feet long film of a polyimide which is the reaction product of pyromellitic acid anhydride and bis-(4-aminophenyl)ether, was stretched 3.6 feet. While the polyimide film was in a stretched condition a silicone adhesive solution was applied to the upper surface of the film. A glass fabric tape one inch wide and 39.6 feet long was adhesively secured to the polyimide film. The adhesive solution contained 4500 grams of a silanol end-stopped polydimethylsiloxane gum having a viscosity of 900,000 centistokes at 25° C. and having the average formula, $$HO[(CH_3)_2SiO]_{1750}H$$

5500 grams of a resinous copolymer of trimethylsiloxane units and $SiO_2$ units containing 0.5 trimethylsiloxane units per $SiO_2$ units, and 200 grams of gamma-aminopropylmethyldi - (N,N - diethylaminoxy)silane, all dissolved in 10 kilograms of toluene. The toluene solvent was allowed to evaporate from the composite and after the toluene solvent has evaporated the composite was heated to 175° C. for five minutes to cure the adhesive. The tension on the composite was removed and the tape was allowed to relax. The length of the relaxed tape was 37.1 feet. The tape was subjected to repeated stretching and relaxation and always returned to its original manufactured length of 37.1 feet. The tape can be stretched 2½ feet which is 6.5% of its length before becoming taut due to the glass fabric layer in the composite. The tape was used to wrap a field coil of an electric motor. The tape had sufficient stretch to conform to the curved portions of the coil and sufficient recovery to produce a smooth uniform covering on the coil. An automatic coil winding machine was used to wind the field coil and the tape worked well in the machine. The wrapped coil was used in an electric motor and provided trouble free performance.

EXAMPLE 2

A one mil thick, one inch wide, and 36 inches long film of a polyimide which was the reaction product of pyromellitic anhydride and bis(4-aminophenyl)ether, was stretched 3.6 inches. While the polyimide film was in a stretched condition, a silicone adhesive solution was applied to the upper surface of the film. The adhesive solution contained 450 grams of a silanol end-stopped polyorganosiloxane fluid having the average formula, $$HO[R_2SiO]_{850}H$$

550 grams of a resinous copolymer of trimethylsiloxane units and $SiO_2$ units containing 0.75 trimethylsiloxane unit per $SiO_2$ units and 20 grams of benzoylperoxide, all dissolved in 1,000 grams of benzene. In the above resins and fluids 87% of the total number of R groups are methyl radicals and 13% of the total number of R groups are phenyl radicals randomly distributed among the available positions.

A glass fabric tape one inch wide and 39.6 inches long was adhesively secured to the polyimide film. The benzene solvent was allowed to evaporate from the composite at room temperature and after the benzene solvent had evaporated the composite was heated to 175° C. for five minutes to cure the adhesive. The tension on the composite was removed and the tape was allowed to relax. The length of the relaxed tape was 37.0 inches.

A pressure sensitive adhesive composition was formulated containing 550 grams of a resinous copolymer of trimethylsiloxane units and $SiO_2$ units containing 0.75 trimethylsiloxane unit per $SiO_2$ unit, 1550 grams of benzene, 450 grams of a silanol end-stopped polydimethylsiloxane gum having a viscosity of 5 million centistokes at 25° C., 15 grams of gamma-aminopropylmethyldi-(N,N-dimethylaminoxy)-silane, and 50 grams of isopropyl alcohol. The adhesive formulation was applied to the above described composite tape by a knife coating technique and the composite was then dried at 80° C. in a drying oven, followed by curing at 150° C. for 5 minutes. The pressure sensitive adhesive faced tape produced was stretched to 39.6 inches and recovered to 37.1 inches in each of 10 consecutive trials.

EXAMPLE 3

A solution was made up containing 600 grams of a resinous copolymer of trimethylsiloxane units and $SiO_2$ units containing 0.5 trimethylsiloxane unit per $SiO_2$ unit, 400 grams of a silanol stopped fluid having the average formula, $$HO[(R)_2SiO]_{300}H$$

30 grams of gamma-aminopropylmethyldi-(N,N-diethylaminoxy)-silane, 75 grams of methylisobutylketone and 700 grams of xylene. In the above resin and fluid 90% of the total number of R groups are methyl radicals and 10% of the total number of R groups are phenyl radicals randomly distributed among the available positions.

An asbestos mat 3½ mils thick, one inch wide, and 37 inches long was floated on the above solution until the top side was wetted by the solution permeating the mat. The mat was then submerged, removed from the solution and excess solution was wiped from the surface of the mat. The mat was allowed to hang for one hour to evaporate the xylene, then placed in a 100° C. oven for one hour to cure the siloxanes to an elastomeric resin.

A one mil thick, one inch wide, and 36 inch long film of a polyimide which is the reaction product of pyromellitic anhydride and bis-(4-aminophenyl)ether, was stretched 3.6 inches. While the polyimide film was in a stretched condition, a silicone adhesive solution was applied to the upper surface of the film. A glass fabric tape one inch wide, and 39.6 inches long was adhesively secured to the polyimide film. The adhesive solution contained 500 grams of a silanol end-stopped polydiorganosiloxane fluid having the average formula, $$HO[R_2SiO]_{500}H$$

700 grams of a resinous copolymer of trimethylsiloxane units and $SiO_2$ units, containing 0.85 trimethylsiloxane unit per $SiO_2$ unit, and 20 grams of gamma-aminopropylmethyldi-(N,N-dimethylaminoxy)silane all dissolved in 1000 grams of benzene. In the above formulas 90% of the total number of R groups are methyl radicals and 10% of the total number of R groups are phenyl radicals randomly distributed among the available positions. The benzene solvent is allowed to evaporate from the composite tape in a drying oven at 100° C. for 5 minutes, then the tape is heated to 150° C. for 10 minutes to cure the adhesive. The tension on the composite was then removed and the tape was allowed to relax. The length of the relaxed tape was 37 inches.

A pressure sensitive adhesive was formulated containing 700 grams of a resinous copolymer of trimethylsiloxane units and $SiO_2$ units, containing 0.90 trimethylsiloxane unit per $SiO_2$ unit, 1000 grams of a silanol end-stopped polydiorganosiloxane gum having a viscosity of 15 million centistokes at 25° C., 500 grams of benzene, 10 grams of gamma-aminopropylmethyldi(N,N-dipropylaminoxy)silane and 100 grams of methylisobutylketone. In the above resin 90% of the total number of R groups are methyl radicals and 10% of the total number of R groups are phenyl radicals. The same ratio applies to the organo groups of the silanol stopped gum. That is 90% of the total number of organo radicals are methyl radicals and 10% of the total number of organo radicals are diphenyl radicals.

The pressure sensitive adhesive was used to secure the glass fabric face of the polyimide backed tape to the impregnated asbestos mat described above. The composite produced was allowed to dry for one day at room temperature, then cured for 4 hours at 45° C.

The tape produced was stretched to 39 inches and recovered to 37.5 inches within 5 seconds after stretching.

What I claim as new and desire to secure by Letters Patent of the United States is:

1. An elastic tape laminate comprising a glass fabric having crinkled warp threads, an elastic polyimide film backing and a polysiloxane resin bonding the glass fabric to the polyimide film.

2. The tape of claim 1 in which the polyimide is the reaction product of pyromellitic anhydride and a diamine selected from the class consisting of p-phenylenediamine, m-phenylenediamine, bis(4-aminophenyl)methane, bis(4-aminophenyl)isopropylidene, bis(4-aminophenyl)sulfide, bis(4 - aminophenyl)sulfone, and bis(4 - aminophenyl) ether.

3. An elastic tape laminate as set forth in claim 1 having a pressure sensitive polysiloxane adhesive coating on the face of the glass fabric opposed to the polyimide film.

4. An elastic tape laminate as set forth in claim 1 having a silicone resin impregnated asbestos facing and a polysiloxane resin bonding the silicone resin impregnated asbestos facing to the face of the glass fabric opposed to the polyimide.

5. An elastomeric tape as set forth in claim 4 wherein the silicone resin impregnant contains 40 to 60 weight percent based upon total silicone of $R_3SiO$ units and $SiO_2$ units; and 40 to 60 weight percent based upon total silicone of $(R_2SiO)_n$ units wherein R is a monovalent hydrocarbon radical.

6. A method of making the tape of claim 1 comprising elongating a film of polyimide from 5% to 10% of its original length, coating one side of the film with a polysiloxane resin adhesive, applying a woven glass fabric to the elongated film of polyimide, curing the polysiloxane adhesive and then allowing the polyimide sheet to relax from its elongated configuration whereby the yarns of the woven glass fabric in the direction of elongation are crinkled.

References Cited

UNITED STATES PATENTS 2,951,277   9/1960   Youngs _____ 161—77 XR
3,179,634   4/1965   Edwards _____ 260—78

ROBERT F. BURNETT, Primary Examiner

W. A. POWELL, Assistant Examiner

U.S. Cl. X.R.

156—160, 183, 229; 161—95, 128, 205, 206, 227